United States Patent [19]

Nattel

[11] 4,176,759
[45] Dec. 4, 1979

[54] ELECTRICAL OUTLET BOX

[75] Inventor: William Nattel, Montreal, Canada

[73] Assignee: GTE Sylvania Canada Limited, Montreal, Canada

[21] Appl. No.: 14,511

[22] Filed: Feb. 23, 1979

Related U.S. Application Data

[62] Division of Ser. No. 761,473, Jan. 24, 1977.

[30] Foreign Application Priority Data

Dec. 17, 1976 [CA] Canada .................................. 268114

[51] Int. Cl.² .............................................. H02G 3/08
[52] U.S. Cl. .................................... 220/3.94; 220/4 F
[58] Field of Search ...................... 220/3.92, 3.94, 4 F

[56] References Cited

U.S. PATENT DOCUMENTS

| | | | |
|---|---|---|---|
| 1,221,944 | 4/1917 | Wurdack | 220/3.92 |
| 1,454,722 | 5/1923 | Boutin | 220/3.92 |
| 1,534,723 | 4/1925 | Lewis | 220/4 F |
| 2,028,509 | 1/1936 | Knell | 220/3.94 |
| 2,420,184 | 5/1947 | Mickelburg | 220/3.94 |
| 2,552,400 | 5/1951 | Brunia | 220/3.94 |
| 3,622,029 | 11/1971 | Ware | 220/3.94 |

*Primary Examiner*—Herbert F. Ross
*Attorney, Agent, or Firm*—David M. Keay

[57] ABSTRACT

An improved electrical outlet box of the type having a spacer member, providing a back wall and end walls, and two side walls. The box has cooperating members for rotatably wedging one end of each side wall against an end wall to securely fasten it to the spacer member. The box also has an arrangement for camming the end walls together with the side walls to provide a tight box. The box includes bulged side walls for providing additional working space within the box while at the same time improving its mounting. The box also includes a different improved arrangement for use in fastening it to a support.

3 Claims, 17 Drawing Figures

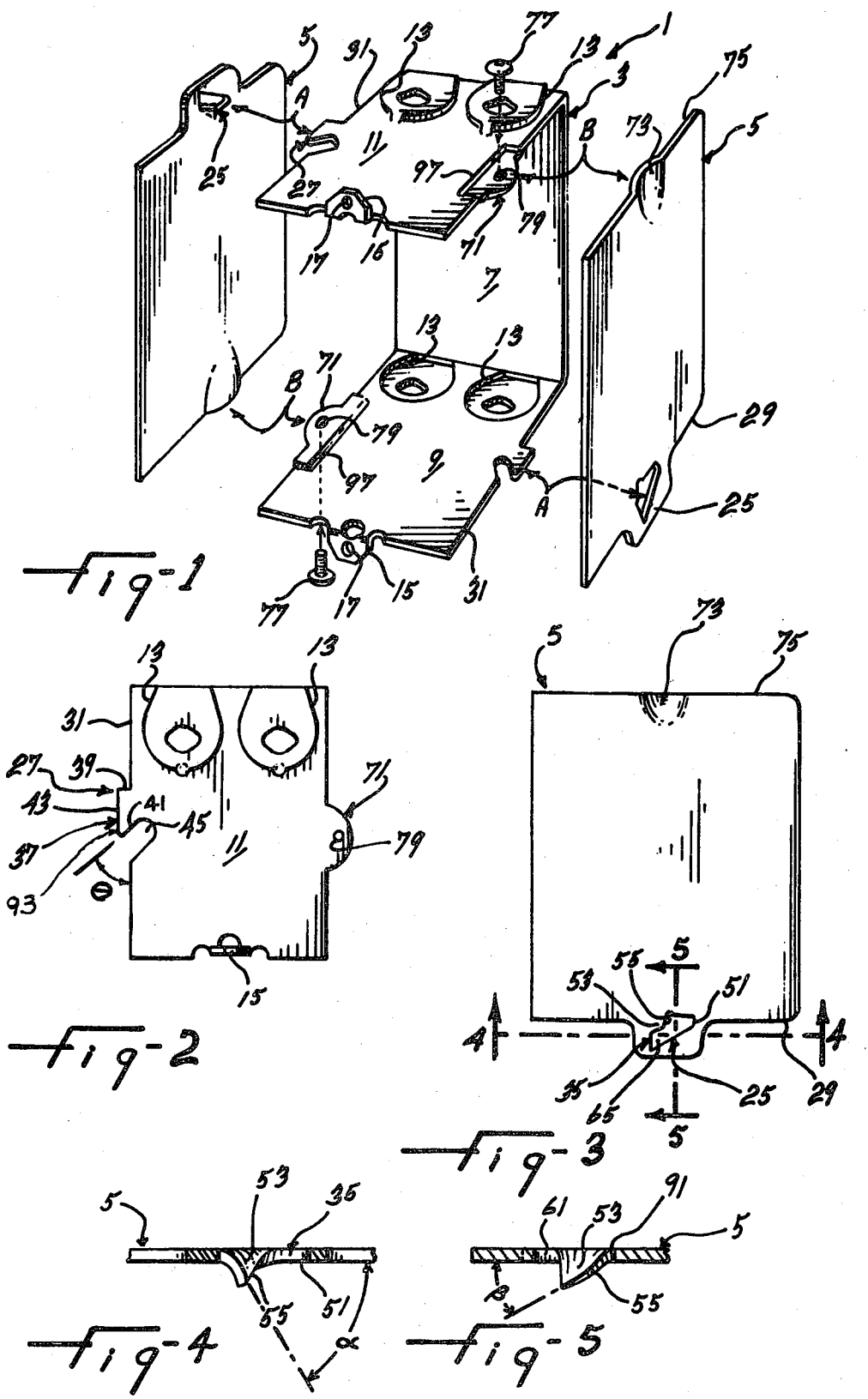

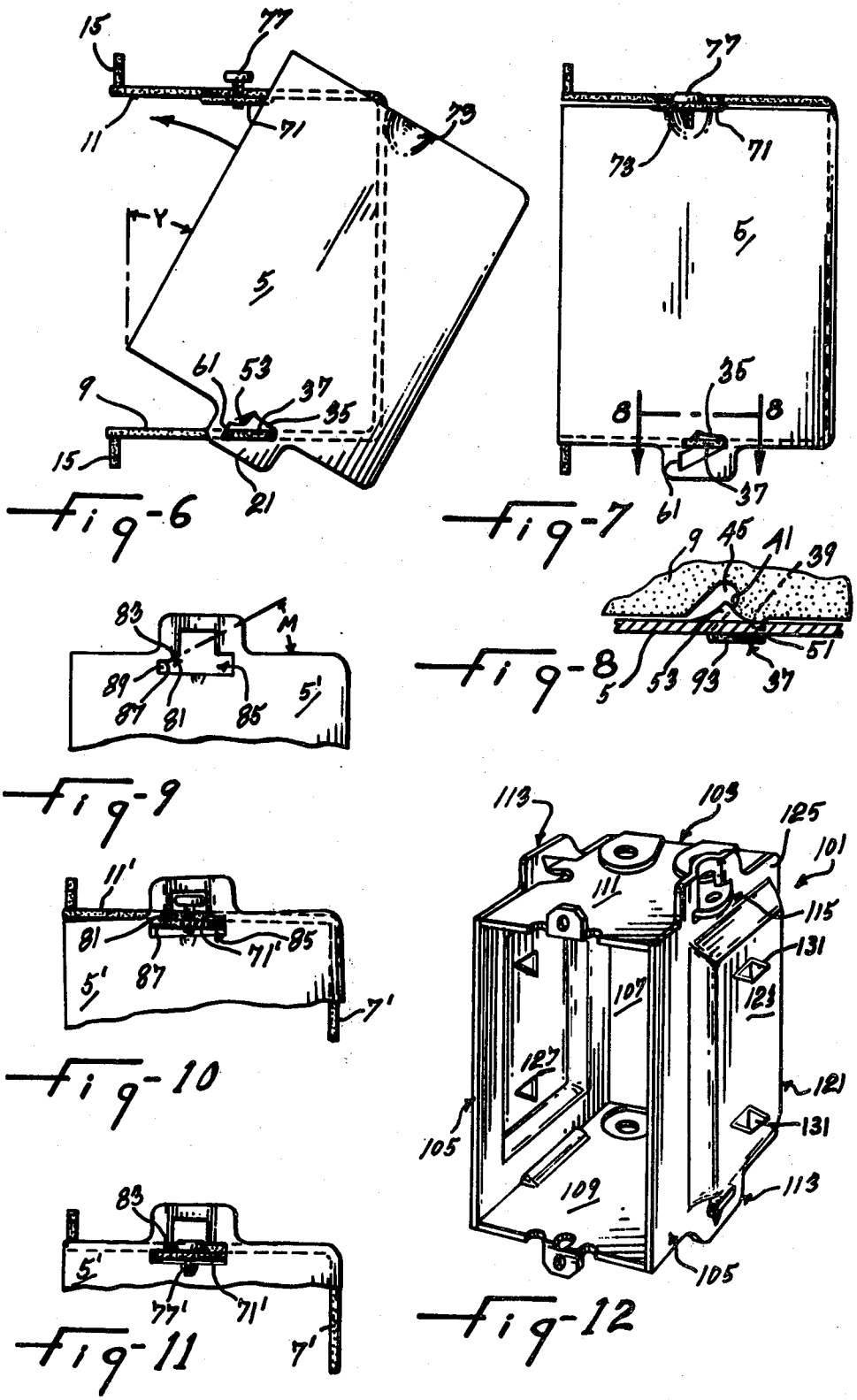

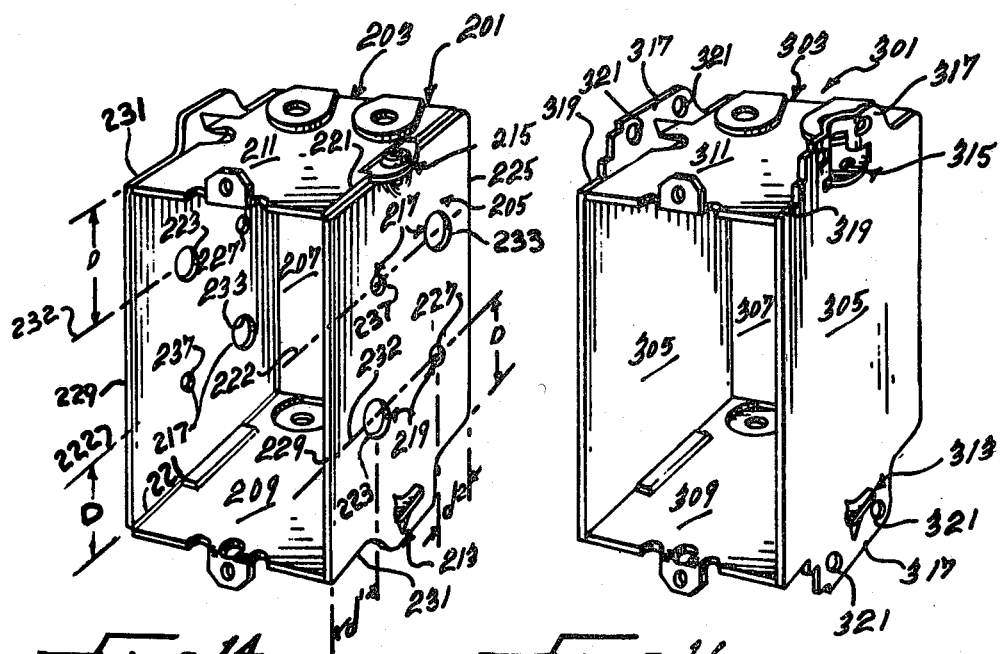
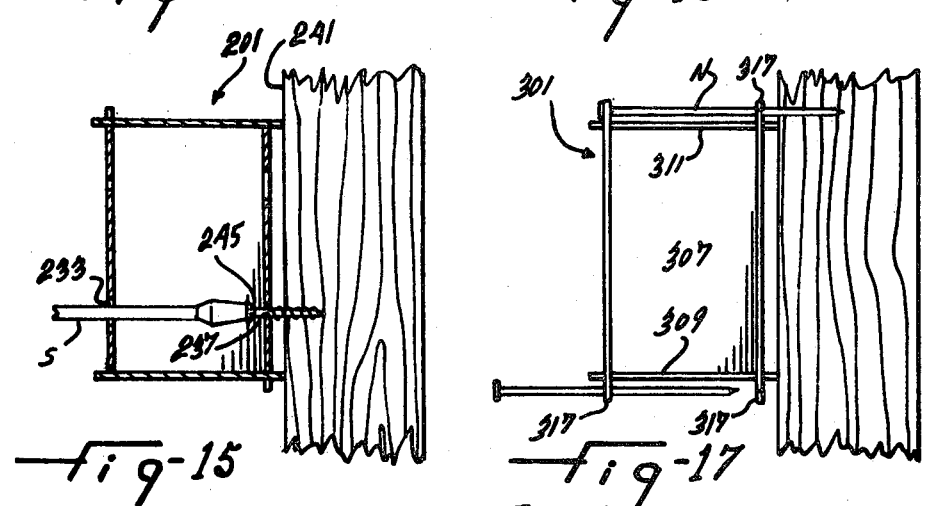
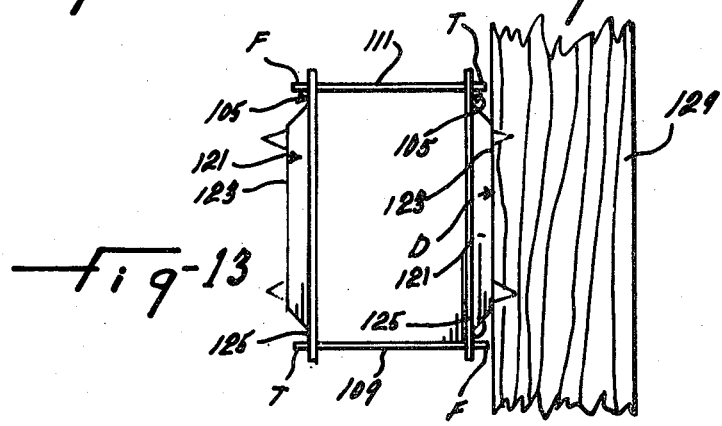

ELECTRICAL OUTLET BOX

This is a division, of application Ser. No. 761,473, filed Jan. 24, 1977.

This invention is directed towards improvements in electrical outlet boxes.

The invention is more particularly directed toward improvements in sectional electrical outlet boxes, of the type having separate side walls, and used to mount receptacles, switches, and the like.

Sectional outlet boxes presently used have several disadvantages. For example, the boxes presently used are somewhat difficult to assemble due to the manner in which the separate side walls are connected to the end walls of the spacer member. Usually, the side walls and end walls have cooperating fingers which, through awkward manipulation of the side walls relative to the end walls, are entwined together. Also, the boxes generally cannot be assembled as tightly as is desirable, again due to the manner in which the side walls are connected. The cooperating fingers do not tightly lock together.

The outlet boxes presently employed are also somewhat awkward to mount against a support, such as a wall stud, due to laterally projecting connecting means on their side walls. The projecting connecting means often bear unevenly, and unsteadily, against a stud making it difficult to squarely, and firmly, mount the box.

The known outlet boxes are also quite cramped for interior space particularly now that the boxes are usually grounded and aluminum wire of larger gauge may be used.

Outlet boxes now in use also often employ nails as fastening means which pass through the interior of the box thus reducing the usable space within the box. Other outlet boxes now in use employ extended plate sections by means of which the box can be fastened with screws to a stud. The plate sections however are quite large and add to the cost of the box.

It is the purpose of the present invention to provide improvements in outlet boxes which overcome, or at least minimize, the above disadvantages.

In accordance with the present invention, improved sectional outlet boxes are provided which can be more easily and positively assembled.

Improved sectional outlet boxes are also provided which can be more tightly assembled to minimize rattling of the assembled boxes, and to provide a stronger box.

Further, in accordance with the present invention, an outlet box is provided having improved mounting means for more easily mounting the box. In addition, the improved mounting means increases the usable working space within the box.

Also in accordance with the present invention there is provided an improved outlet box having mounting means which do not limit the usable space within the box.

An improved outlet box is also provided with mounting means permitting the use of screws to provide tighter mounting without requiring additional material.

The improved outlet box of the present invention is more efficient in the use of material, and thus less expensive.

The invention is particularly directed toward an electrical outlet box having a spacer member and two side walls with the spacer member comprising a back wall and end walls. First means connect one end of each side wall to an end wall and second means connect the other end of each side wall to the opposite end wall. The first connecting means comprise first and second cooperating means on the side wall and end wall respectively for wedging the side wall against the end wall as the side wall is rotated relative to the spacer member about the first connecting means from a first initial mounting position where the side wall is at a slight angle to the spacer member, to a second final mounting position where the side wall is square with the spacer member and closes an open side.

The invention is further directed toward an electrical outlet box having a spacer member and two side walls. The spacer member has a back wall and a pair of end walls extending laterally from the ends of the back wall. The end walls diverge slightly from each other. First means connect one end of each side wall to an end wall. Second means connect the other end of the side wall to the opposite end wall. The second connecting means has third and fourth cooperating means on the side wall and end wall respectively for camming the end walls slightly toward each other to a substantially parallel position relative to one another and means for locking the third and fourth means together with the end walls in the substantially parallel position.

The invention is also directed toward an electrical outlet box having a spacer member and two side walls with the spacer member providing a back wall and end walls. First means connect one end of each side wall to an end wall and second means connect the other end of each side wall to the opposite end wall. Each side wall has an outwardly directed bulge. The bulge extends outwardly from the box at least as far as the first and second connecting means and has a flat outer surface which is substantially parallel with the remainder of the side wall to provide a mounting surface of the box.

The invention, in another embodiment, is directed toward an electrical outlet box having a spacer member and two side walls with the spacer member providing a back wall and end walls. First means connect one end of each side wall to an end wall and second means connect the other end of each side wall to the opposite end wall. Each side wall has a fastening tab projecting from each end edge with each tab lying in the plane of the side wall and each tab has a pair of laterally spaced-apart fastener guide holes.

The invention in still another embodiment is directed toward an electrical outlet box having a spacer member and two side walls with the spacer member providing a back wall and end walls. First means connect one end of each side wall to an end wall and second means connect the other end of each side wall to the opposite end wall. Each side wall has a pattern of openings for use in fastening the box to a support. The pattern comprises two spaced-apart small openings in one side wall and two larger openings in the other side wall. The pattern of openings being such in an assembled box the small openings in one side wall are aligned with the large openings in the other side wall.

The invention will now be described in detail having reference to the accompanying drawings in which:

FIG. 1 is an exploded perspective view of the improved outlet box of the present invention;

FIG. 2 is a top view of the spacer member of the box;

FIG. 3 is a plan view of the side wall;

FIG. 4 is a cross-sectional view taken along line IV—IV of FIG. 3;

FIG. 5 is a cross-sectional view taken along line V—V of FIG. 3;

FIG. 6 is a side view showing the side wall in an initial mounting position on the spacer member;

FIG. 7 is a side view showing the side wall mounted;

FIG. 8 is a cross-sectional view along line VIII—VIII of FIG. 7;

FIG. 9 is a view of a modified side plate;

FIG. 10 shows the modified side plate initially mounted on the spacer member;

FIG. 11 shows the modified side plate completely mounted on the spacer member;

FIG. 12 is a perspective view showing another embodiment of the outlet box;

FIG. 13 is a front view of the box shown in FIG. 12 mounted on a stud;

FIG. 14 is a perspective view of yet another embodiment of the outlet box;

FIG. 15 is a cross-sectional view showing the box of FIG. 14 mounted on a stud;

FIG. 16 is a perspective view of a further embodiment of the outlet box;

and FIG. 17 is a cross-sectional view showing the box mounted on a stud.

The electrical outlet box 1 of the present invention as shown in FIG. 1, comprises a spacer member 3 and two side walls 5. The spacer member 3 has a back wall 7 and two integral end walls 9 and 11, extending from the ends of the back wall 7. The end walls, 9 and 11 are generally parallel to one another and perpendicular to the back wall 7. The side walls 5 are sized to close the open sides of the spacer member 3 and have a length substantially equal to the length of back wall 7 and width substantially equal to the length of end walls 9 and 11. Knockouts 13 for providing cable or conduit access to the box as is known, are provided on end walls 9 and 11, adjacent back wall 7. In addition, mounting tabs 15 are provided on the front edge of the end walls 9 and 11 with a threaded hole 17 therein, to which receptacles, switches or the like are attached then mounted within the box, as is known.

Cooperating means "A", "B" are provided to detachably connect each end of each side wall 5 to the sides of the end walls 9 and 11, to close the sides of the service box. One of the detachably connecting cooperating means "A" comprises cooperating wedging means 25, 27 on one end 29 of side wall 5 and the edge 31 of end wall 9 respectively. The wedging means 25 on end 29 of side plate 5 includes an opening 35 as shown in FIG. 3. The wedging means 27 on the side edge 31 of end wall 9 comprises a finger 37 insertable into opening 35.

The finger 37 lies in the same plane as end wall 9 and projects laterally from the approximate center of side edge 31. The finger 37, as shown in FIG. 2, has a first abutment edge 39 which extends perpendicular to side edge 31. A second abutment edge 41 is provided on the other side of the finger which extends at an angle θ to side edge 31. The angle θ is about 45°. The second edge 41 angles inwardly toward edge 39 so that the outer edge 43 of finger 37 is wider than its width along side 31. A slot 45 is provided in end wall 11 extending inwards from side edge 31 adjacent finger 37 so that the second abutment edge 41 of finger 37 can extend into end wall 11, to provide a portion of the side of slot 45.

The opening 35 on side wall 5, as shown in FIG. 3, has a first abutment edge 51 at one end thereof. This edge 51 can be rounded. A wedging surface 53 is located at the other end edge 55 of the opening opposite end edge 51. This wedging surface 53 is formed by first bending a substantially rectangular portion of the side wall 5, adjacent end edge 55 of opening 35, and opposed to end edge 51, inwardly at an angle α as shown in FIG. 4, in the plane of the side wall 5. The surface 53 is also bent inwardly of the side wall 5 at an angle β as shown in FIG. 5, in the plane of the wall. Angle α preferably is about 45° and angle β preferably is about 20°.

The opening 35 includes an extension 61 which extends slightly down and past end edge 55, away from abutment edge 51. The extension 61 of opening 35 provides the opening with a portion which is slightly longer or wider than the length of the outer edge 43 of finger 37.

To mount side wall 5 onto spacer member 3 the side wall 5 is positioned against the open side of spacer member 3 at an angle "Y" such that finger 37 can slide through opening 35 with a portion of the finger passing through extension 61 as shown in FIG. 6. The side wall 5 is then rotated counterclockwise, viewing FIG. 6 to position wall 5 squarely relative spacer member 3 to close the open side as shown in FIG. 7. With this rotation, wedging surface 53, being bent slightly inward at an angle β, slides over and past angled abutment edge 41 of finger 37, wedging the edges 39 and 41 of finger 37 tightly between edge 51 and the wedging surface 53 which define a portion of the opening 35 narrower than the outer edge 43 of the finger 37. The rotational wedging action serves to positively lock wide wall 5 to spacer member 3 as shown in FIG. 8 so that the box is tight and rattle free. The mounting operation of side wall 5 to spacer member 3 is quite simple since the side wall 5 is merely rotated from an initial angular position to a square position.

The other cooperating connecting means "B" at the other end of side wall 5, to connect this end to spacer member 3, can comprise known locking means consisting of a projecting tab 71, extending laterally from end wall 11; and a slight depression 73 within side wall 5 extending from end edge 75 a short distance toward end edge 29 of side wall 5 and formed in the outer surface of side wall 5. The depression 73, as shown in FIG. 1 or 3 extends perpendicularly to end edge 75 and to tab 71 when side wall 5 is squarely mounted on spacer member 3. A screw 77, threaded through a hole 79 in tab 71, slides into depression 73 locking side wall 5 against walls 7 and 11 of spacer member 3.

To obtain a much tighter outlet box, the box, and the cooperating connecting means B is preferably slightly modified in the following manner. Instead of having the end walls substantially parallel to each other, they are formed to diverge slightly from one another as shown in an exaggerated manner in FIG. 10. The cooperating connecting means "B" is modified to include camming means for moving the end walls together to a substantially parallel position when mounting the side wall on the spacer member. The camming means includes a camming surface 81 for contacting the outside of tab 71' and camming it, and thus end wall 11', toward the other end wall as side wall 5' is mounted flush and square on the spacer member. The cam surface 81 can comprise a cam edge 83 at one side of an opening 85 formed in wall 5' into which opening the tab 71' is inserted. The cam edge 83 extends down and out from near the top of the opening 85 to bear down on the tab when the tab is initially inserted in the opening. At the bottom of cam edge 83, and extending outwardly therefrom, is a locking edge 87 extending generally parallel to the end edge of side wall 5'. The locking edge 87 defines the top part of an extension 89 of opening 85. Cam edge 83 can extend down and out at an angle of approximately 30°.

When the box is assembled, and side wall 5' is placed against the spacer member 3, it is attached first by wedging connecting means similar to that shown at 21 in the embodiment of FIG. 6. In attaching the side wall 5' with connecting means at one end to the end wall, the other end of the side wall 5' is moved slightly away from end wall 11' and slides over tab 71' until the tab 71' registers with opening 85 and enters into it, with cam edge 83 bearing on one side of tab 71'. When tab 71' initially enters opening 85, side wall 5' rests some slight distance away from spacer member. Because the end walls are slightly sprung apart however, the wall 5' will also rest in a slightly askew position relative to the spacer member as shown in FIG. 10 with the tab 71' located between camming edge 83 and opposite side 89 of opening 85. To securely lock wall 5' to the spacer member, the wall 5' is now pressed against the spacer member to move cam surface 83 over tab 71' and to cam tab 71' down and beneath locking edge 87 and into extension 89 of opening 85. This camming movement causes wall 5' to rotate slightly in a clockwise direction about its lower connecting means to bring the edge of wall 5' into line with back wall 7'. In camming, tab 71' in this manner, the sprung end walls are moved slightly together, and then held by locking edge 87 to provide a tight, secure box. Screw 77' is then used to lock side plate 5' in this position, with the depression in the side plate being aligned with the hole in tab 71. The modified cooperating connecting means "B" can be used together with connecting means other than connecting means "A" at the one end 29 of wall 5' if desired. The use of connecting means "A", and modified connecting means "B" together however provides an extremely tight, secure box.

To more easily allow side wall 5' to rotate clockwise about the connecting means 21 when camming tab 71 down, bottom slot as shown at 35 in FIGS. 1-8 is slightly enlarged, particularly at its end 51 to provide clearance for the finger as shown at 37 in FIGS. 1-8 permitting this rotational movement. In addition, to make it easier to slide wall 5' over tab 71' into registry with opening 85, that portion 91 of the wall 5 above and adjacent cam surface 53 can be slightly depressed as shown in the embodiment of FIGS. 3 and 5, to accommodate the end 93 of finger 37 as the wall 5 is being mounted.

The box is constructed so that each end wall has a finger along one edge and a tab 71' along the other edge. Each side wall 5' may be identical with a slot having a cam surface, for receiving a finger at one end, and an opening with a cam edge 83 for receiving tab 71' at the other end. The side walls 5' would thus be reversed to one another when mounted on a spacer member.

Two or more spacer members 3, may be joined together to form a multiple outlet box. To permit this, the projecting tab 71 and the area immediately around it defined by the line 97 is depressed out of the plane of end walls 9 and 11. When two spacer members 3 are brought together, the tabs 71 pass under the fingers 37 and the screw 77 lines up with slot 45. The spacer members 3 are secured to one another by tightening screw 77.

In another embodiment of the invention, in providing an improved outlet box, the side walls of the box can be bulged outwardly as shown in FIGS. 12 and 13. In this embodiment, a box 101 is provided having a main spacer member 103 and two side walls 105. The spacer member 103 has a back wall 107 and a pair of end walls 109 and 111. Suitable cooperating means 113 and 115 are provided at each end of each side wall 105 for detachably connecting it to the spacer member 103. The cooperating connecting means 113 and 115 can be the same as the connecting means "A", "B" shown in FIGS. 1 and/or 9 and previously described.

In accordance with the present embodiment, each side wall 105 is formed with an outwardly extending bulge 121. The bulge 121 preferably occupies a major portion of the area of the side wall 105. The bulge 121 is formed with an outer wall 123 which is flat and parallel with the remaining outer surface 125 of the side wall 105. The bulge 121 provides a recess 127 in the interior of the box which adds to its usable interior space. This additional space is particularly useful with the extra space now required by the use of aluminium wire and for a grounding wire for the box. In addition, the outer flat wall 123 of the bulge provides a flat, side mounting surface for the box. The box can be mounted with the wall 123 flat against a stud 129, as shown in FIG. 13 to provide improved ease of mounting. To this end, the bulge 121 is sized to extend outwardly from side wall 105 a distance "D" which is at least equal to the distance the tabs "T" and/or fingers "F" of connecting means 113, 115 project laterally from the box. The bulge 121 permits the box to be mounted flat and square without interference from the projecting tabs and/or fingers.

The flat outer wall 123 can be provided with one or more prongs 131 for mounting the outlet box to a wood stud. Although these prongs 131 would probably not be used to secure the outlet box permanently, they can be used to great advantage for temporarily holding the outlet box in place until it can be properly secured by the use of nails or screws.

Normally the prongs 131 would be provided on only one side wall 105. The wall 105 with prongs 131 would be held adjacent to a wood stud 129 and hit to drive the prongs into the stud. The outlet box can be turned upside down to place the side wall with prongs on the opposite side. If desirable the prongs can be fitted to both side walls and in such a case the outlet box could have two identical side walls 105.

In a further embodiment of the invention, in providing an improved outlet box, the box can be provided with improved means for use in mounting the box. In accordance with this embodiment, as shown in FIGS. 14 and 15 the box 201 comprises a main spacer member 203 and two side walls 205. The main spacer member 203 has a back wall 207 and end walls 209 and 211. Suitable means 213, 215 are provided for detachably connecting the ends of each side wall 205 to the open sides of the main spacer member 203. The connecting means 213, 215 can be the same as previously described connecting means "A", "B" shown in FIGS. 1 and/or 9.

Each side wall 205 is provided with a pattern of mounting holes. The set of mounting openings or holes comprise two spaced-apart small holes 227 and 237 in the first side wall 205 and two larger spaced-apart holes 223 and 233 in the second side wall 205.

The pattern of the holes is such that in the assembled box 201 the large holes in one wall are aligned with the small holes in the other wall. The box can be mounted by placing the side wall with the small holes adjacent a stud 241 as shown in FIG. 15 and attached thereto with a pair of screws 245 passing through the small holes 227 and 237. The screws are fastened with a screwdriver "S" passing through the larger aligned holes 223 and 233 in the side wall spaced from the stud.

It is sometimes advantageous to have two identical side walls 105. In this case each side wall 205 provided with the identical pattern or mounting holes. The set of mounting holes comprises first and second longitudinally spaced-apart pairs 217, 219 of two different sized, laterally spaced-apart holes as is shown in FIG. 14. The first pair of holes 217, near one end edge 221 of side wall 205, lie spaced-apart on an imaginery line 222 which is parallel to edge 221 with the larger hole 233 near the inner side edge 225 of wall 205, and with the smaller hole 237 near the outer side edge 229 of wall 205.

The second pair of holes 219, near the other end edge 231 of side wall 205, lie spaced-apart on an imaginary line 232 which is parallel to edge 231 and to line 222. Line 232 is located a distance "D" from edge 231 which is equal to the distance "D", line 222 is located from edge 221. The second pair of holes 219 comprise a larger hole 223, equal in size to hole 233 near outer side edge 229, and a smaller hole 227, equal in size to hole 237, near inner side edge 225.

Holes 233 and 227 are located a distance $d^2$ from inner side edge 225, and holes 237 and 223 are located a distance $d^1$ from outer side edge 229.

The completed box 201 with the side walls 205 mounted to spacer member 203 has a large hole in each wall aligned with a small hole in the other wall. The box can be mounted with either of side walls 205 against a stud 241 as is shown in FIG. 15 and attached thereto with a pair of screws 245 passing through the small holes 227, 237 in the side wall adjacent the stud. The screws are fastened with a screwdriver "S" passing through the larger, aligned holes 233, 223 in the side wall spaced from the stud. The box can be provided with bulged side walls if desired, with the pattern of holes located in the wall of the bulge. The pattern of mounting holes can also, if desired be used to receive nails driven through the box into an adjacent stud to mount the box on the stud. The use of the specific pattern of mounting holes permits the box to be tightly mounted with screws without reducing the working space within the box and without requiring the use of tab or plate-like extensions.

It is of course obvious that the orientation of the holes can be reversed from that shown in the drawings and as described above.

In still another embodiment of the invention, as shown in FIGS. 16 and 17 the improved box can be provided with improved means for mounting it to a stud with nails. In this embodiment, the box 301 has a main wall member 303 with a pair of side walls 305. The wall member 303 has a back wall 307 and end walls 309 and 311. Suitable means 313 and 315 are again provided for detachably connecting the side walls 305 to the wall member 303. These connecting means 313 and 315 can be the same as the connecting means "A", "B" previously described, and as shown in FIGS. 1 and/or 9. In this embodiment, each side wall 305 is provided with a tab 317 at each end which projects from the end edges 319 of side wall 315. Each tab 317 lies in the plane of the side wall and has a pair of spaced-apart mounting holes 321 therein. Nails "N" can be driven through the holes at the top and/or bottom of the box to fasten it to a stud. These nailing tabs 317 can be used with boxes having bulged side walls, and with a pattern of mounting holes in the main body of the side walls to provide various ways of mounting the box.

The holes 321 can of course be located such that the holes in the side walls at either end of the assembled box are aligned.

It is frequently advantageous to drive the nails "N" through the front hole 321 on one side wall and through the back hole 321 in the other side wall. This results in the nail being driven at an angle to the stud and the hammer used to drive in the nail does not come into contact with the adjoining stud.

The embodiments of the invention in which an exclusive property or privilege is claimed are defined as follows:

1. An electrical outlet box comprising a spacer member and two side walls, the spacer member having a back wall and a pair of end walls which extend from the ends of the back wall and diverge slightly from each other, first means for connecting one end of each side wall to one end wall; second means for connecting the other end of each side wall to the opposite end wall; the second connecting means having third and fourth cooperating means on the side wall and opposite end wall respectively for camming the end walls to a substantially parallel position and means on said connecting means for locking the third and fourth means together with the end walls in the substantially parallel position, said third cooperating means comprises an opening in the side wall, the opening having a camming surface on one side thereof, the fourth cooperating means comprising a tab projecting from the opposite end wall, the tab insertable into the opening where it can be cammed by the cam surface toward said one end wall.

2. An electrical outlet box as claimed in claim 1 including a locking edge adjacent the camming edge under which the tab is cammed.

3. An electrical outlet box as claimed in claims 1 or 2 wherein the locking means comprises a screw threaded through a hole in the tab to bear against the outside of the side wall.

* * * * *